(12) United States Patent  (10) Patent No.: US 8,289,435 B2
Lim  (45) Date of Patent: Oct. 16, 2012

(54) METHOD FOR DISPLAYING IMAGE BY VIRTUAL ILLUMINATION AND PORTABLE TERMINAL USING THE SAME

(75) Inventor: Tae Gyun Lim, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 497 days.

(21) Appl. No.: 12/534,467

(22) Filed: Aug. 3, 2009

(65) Prior Publication Data

US 2010/0103303 A1   Apr. 29, 2010

(30) Foreign Application Priority Data

Oct. 29, 2008  (KR) .................. 10-2008-0106455

(51) Int. Cl.
*H04N 5/225* (2006.01)
(52) U.S. Cl. ............... 348/333.11; 348/239; 348/333.12
(58) Field of Classification Search .............. 348/333.01–333.13, 239
See application file for complete search history.

(56) References Cited

U.S. PATENT DOCUMENTS

| 6,181,806 | B1 * | 1/2001 | Kado et al. ............. 382/118 |
| 6,961,089 | B2 * | 11/2005 | Kubo ............... 348/333.01 |
| 2005/0099519 | A1 * | 5/2005 | Creamer et al. ......... 348/333.11 |
| 2006/0045317 | A1 * | 3/2006 | Adachi et al. .............. 382/118 |
| 2006/0152516 | A1 * | 7/2006 | Plummer .............. 345/538 |
| 2008/0129765 | A1 * | 6/2008 | Lin et al. ............... 345/694 |
| 2008/0266412 | A1 * | 10/2008 | Park et al. .............. 348/222.1 |

FOREIGN PATENT DOCUMENTS

| KR | 1020030017980 A | 3/2003 |
| KR | 1020040032590 A | 4/2004 |
| KR | 1020050017067 A | 2/2005 |
| KR | 100810379 B1 | 2/2008 |

* cited by examiner

*Primary Examiner* — Tuan Ho
(74) *Attorney, Agent, or Firm* — Jefferson IP Law, LLP

(57) ABSTRACT

An image displaying method using virtual illumination and a portable terminal using the method are provided. The method includes recognizing a face of a person in a captured portrait, setting virtual illumination in the captured portrait, and displaying a virtual illumination effect according to the set virtual illumination. Therefore, the user can apply desired illumination effect to the captured image to generate an effect that the image was captured under an external light source.

18 Claims, 6 Drawing Sheets

METHOD FOR DISPLAYING IMAGE BY VIRTUAL ILLUMINATION AND PORTABLE TERMINAL USING THE SAME

PRIORITY

This application claims the benefit under 35 U.S.C. §119 (a) of a Korean patent application filed in the Korean Intellectual Property Office on Oct. 29, 2008 and assigned Serial No. 10-2008-0106455, the entire disclosure of which is hereby incorporated by reference.

BACKGROUND OF THE INVENTION

1. Field of the Invention

The present invention relates to portable terminals. More particularly, the present invention relates to a method for displaying an image using virtual illumination and to a portable terminal using the method.

2. Description of the Related Art

Portable devices, such as portable terminals, digital cameras, etc., are now ubiquitous. The trend in the development of the portable devices is to decrease their size. The reduction of the size of the portable devices has promoted convergence of digital devices, so that a technology can be developed to integrate a digital camera with a portable terminal. As a result, a user does not need to carry separately a portable terminal and a digital camera. That is, the portable terminal with a digital camera function can allow the user to capture a person, people, or things, etc., using the digital camera function.

The user of the portable terminal captures an image via the camera installed in the portable terminal, considering a position, a type and brightness of an external light source. Examples of the external light source are a natural light source, an electric light, etc. The conventional portable terminal with a digital camera equipped with a flash can capture an image using illumination emitted from the flash.

However, the conventional portable terminal with a digital camera allows a user to capture an image, considering the position, the type and the brightness of an external light source. Although a flash installed in the conventional portable terminal with a digital camera is used, the user of the portable terminal may consider the illumination of the external light source to capture an image.

Furthermore, the conventional portable terminal with a digital camera allows for only a few, preset effects to be applied to an image captured thereby. Therefore, the user of the portable terminal cannot reflect desired illumination effects on the image captured by the conventional portable terminal.

A method is required to reflect a user's desired illumination effect on an image that is captured by the digital camera installed in the portable terminal.

SUMMARY OF THE INVENTION

An aspect of the present invention is to address at least the above-mentioned problems and/or disadvantages and to provide at least the advantages described below. Accordingly, an aspect of the present invention is to provide a method that can allow a user's desired illumination effect on an image and can display the image, and a portable terminal using the method.

In accordance with an aspect of the present invention, a method for displaying an image in a portable terminal is provided. The method includes setting virtual illumination in a captured image, and displaying a virtual illumination effect according to the set virtual illumination.

In accordance with another aspect of the present invention, a method for displaying an image in a portable terminal is provided. The method includes recognizing the face of a person in a captured image, setting virtual illumination in the captured portrait, and displaying a virtual illumination effect according to the set virtual illumination.

In accordance with another aspect of the present invention, a method for displaying an image in a portable terminal is provided. The method includes recognizing the face of a person in a captured portrait, detecting the center of the face of a person in the captured portrait, setting virtual illumination in the captured portrait, and displaying a virtual illumination effect according to the set virtual illumination.

In accordance with another aspect of the present invention, a portable terminal for displaying an image is provided. The terminal includes a camera part for capturing a subject, a display unit for displaying a captured image and a virtual illumination effect, and a controller for setting virtual illumination in the captured image and for controlling the display unit to display the virtual illumination effect according to the set virtual illumination.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will become more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In exemplary embodiments of the present invention, the term 'virtual illumination' refers to a virtual lighting source installed in a portable terminal to reflect an illumination effect on an image that is captured by a digital camera of the portable terminal.

Although, in exemplary embodiments, the present invention is described based on a portable terminal with a camera module, it will be appreciated that the present invention is not limited to the exemplary embodiments. It should be understood that the present invention can be applied to all information communication devices, multimedia devices, and their applications, such as, a mobile communication terminal, a Portable Multimedia Player (PMP), a Personal Digital Assistant (PDA), a smart phone, an MP3 player, etc.

Figure 1:
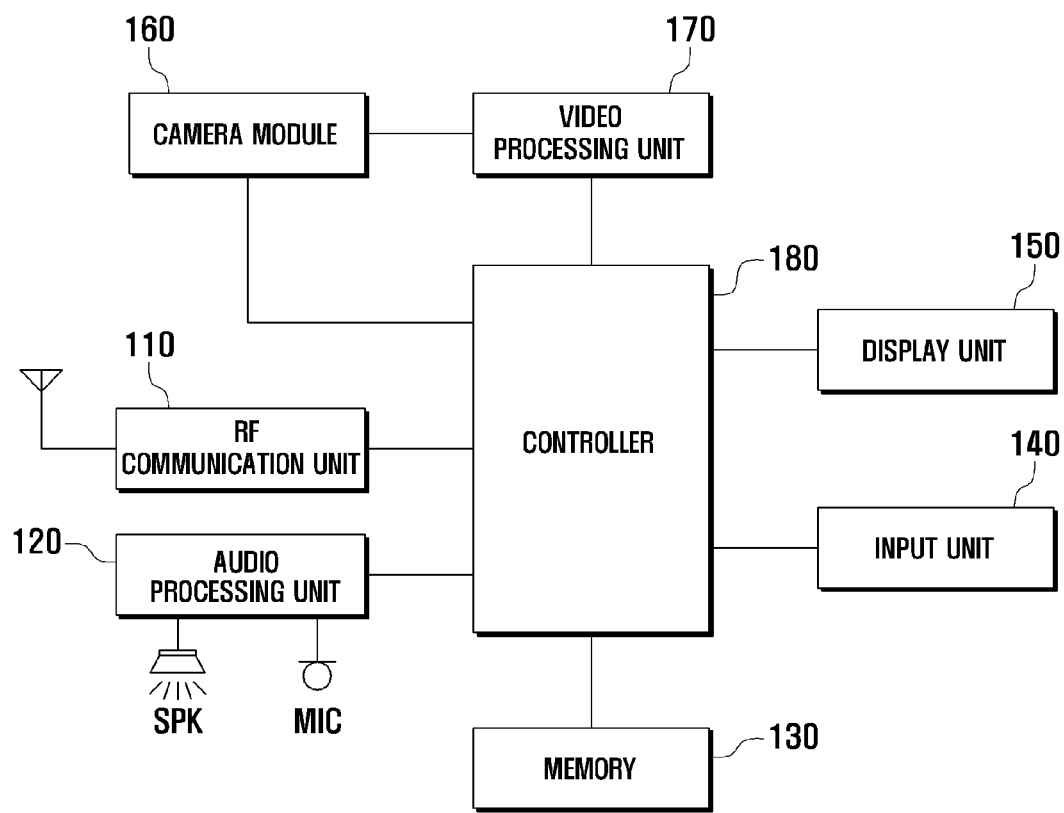
FIG. 1 is a schematic block diagram illustrating a portable terminal according to an exemplary embodiment of the present invention.

FIG. 1 is a schematic block diagram illustrating a portable terminal according to an exemplary embodiment of the present invention.

Referring to FIG. 1, the portable terminal includes a Radio Frequency (RF) communication unit 110, an audio processing unit 120, a memory 130, an input unit 140, a display unit 150, a camera module 160, a video processing unit 170, and a controller 180.

The RF communication unit 110 includes an RF transmitter (not shown) for up-converting the frequency of transmitted signals and amplifying the transmitted signals and an RF receiver (not shown) for low-noise amplifying received RF signals and down-converting the frequency of the received RF signals. The RF communication unit 110 serves to perform an RF communication of the portable terminal. That is, the RF communication unit 110 receives data via an RF channel and outputs the data to the controller 180. The RF communication unit 110 also transmits data output from the controller 180 via the RF channel.

The audio processing unit 120 is implemented with a codec. The codec includes a data codec (not shown) for processing packet data and an audio codec (not shown) for processing audio signals, such as a voice, etc. The audio processing unit 120 converts digital audio signals into analog signals and plays them back, through the audio codec. The audio processing unit 120 also converts analog audio signals, generated through a microphone, into digital audio signals using the audio codec.

A memory 130 stores programs for operating the portable terminal, contents, and user data. In an exemplary embodiment of the present invention, the memory 130 stores captured images. In particular, the memory 130 can store an application program for setting virtual illumination, and data related to a position, a type, and brightness of virtual illumination. The memory 130 can also store an application for detecting a face outline, eyes, a nose and a mouth of a person.

The input unit 140 is implemented with a key pad or a touch pad. The input unit 140 includes keys for inputting numerical numbers and text information and functions for setting a variety of functions. The input unit 140 receives user's operating signals for controlling the portable terminal and outputs them to the controller 180. In an exemplary embodiment of the present invention, the input unit 140 allows a user to set virtual illumination.

The display unit 150 is implemented with a Liquid Crystal Display (LCD). It displays menus of the portable terminal, data input by the user (i.e., user data), function setting information, and other information. In an exemplary embodiment of the present invention, the display unit 150 serves to display a virtual illumination effect and an image to which the virtual illumination effect is applied. It can also display menus for inputting the position, the type, and the brightness of virtual illumination. If the LCD is provided as a touch screen, the display unit 150 may perform a part or all of the functions of the input unit 140.

The camera module 160 captures a subject. It includes a camera sensor for converting an optical signal into an electrical signal and a signal processor for converting an analog video signal into digital data. The camera sensor may be implemented with a Charge-Coupled Device (CCD) sensor or Complementary Metal Oxide Semiconductor (CMOS) sensor. The signal processor may be a Digital Signal Processor (DSP). The camera sensor and the signal processor may be integral or separate.

The video processing unit 170 performs all processes related to video signals, such as encoding and decoding video signals output from the camera module 160. That is, the video processing unit 170 compresses video data in a preset method or decompresses it to the original video data. It includes a video codec. The video codec may be a JPG codec, an MPEG4 codec, a Wavelet codec, etc.

The controller 180 controls operations of the portable terminal. In an exemplary embodiment of the present invention, the controller 180 receives a virtual illumination setting command from the input unit 140 and sets virtual illumination according to the input command signal. It can control the display unit 150 to display a virtual illumination effect on the captured image. If the captured image is a person's image, the controller 180 detects the face outline and displays a virtual illumination effect on it, considering outlines of the eyes, nose and mouth of the person. It should be understood that the exemplary embodiment may be modified in such a way that the controller 180 detects the center in the face image using the detected face outline.

Figure 2:
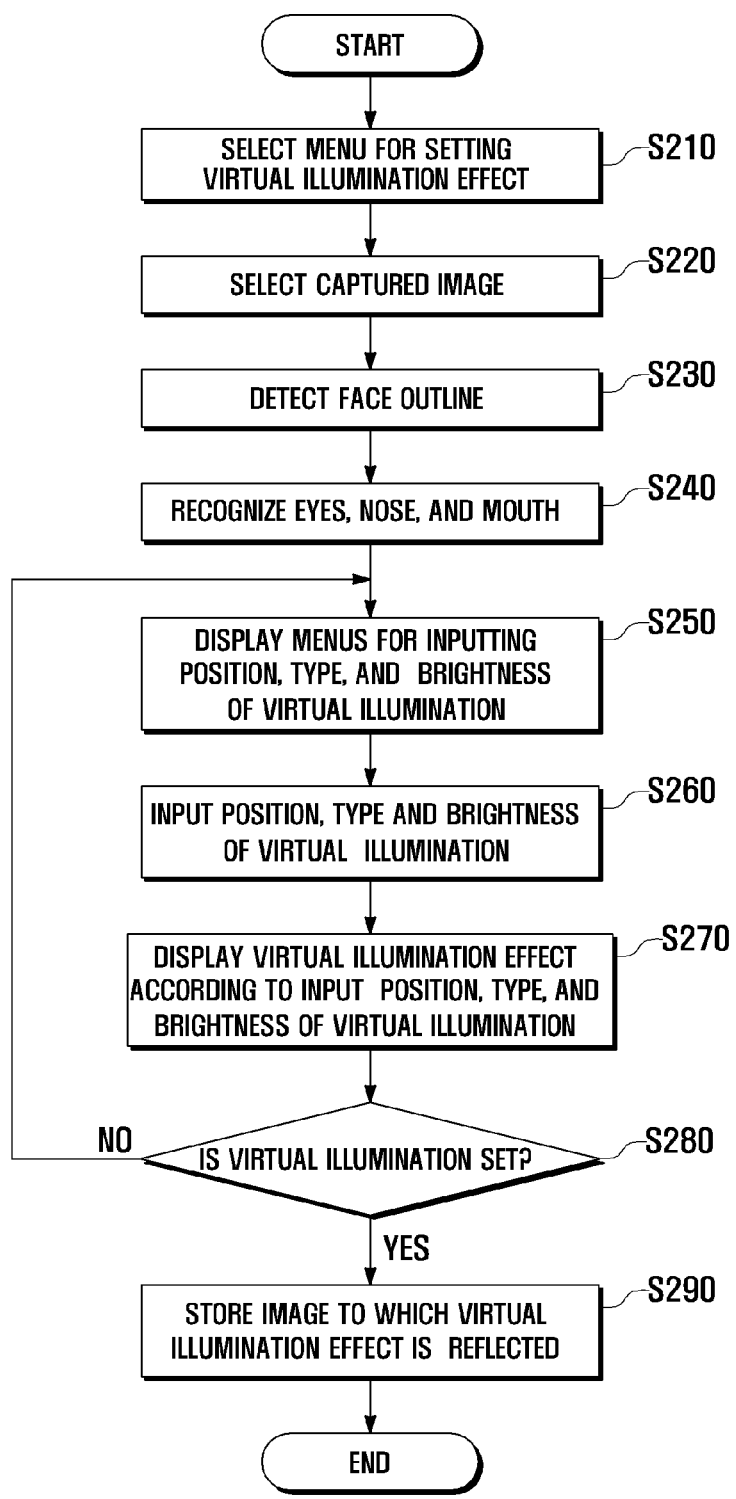
FIG. 2 is a flowchart illustrating a method for displaying an image using virtual illumination according to an exemplary embodiment of the present invention.

FIG. 2 is a flowchart illustrating a method for displaying an image using virtual illumination according to an exemplary embodiment of the present invention.

Referring to FIG. 2, when a menu for setting a virtual illumination effect is selected at step S210, the controller displays images, stored in the memory, on the display unit. The stored images are displayed in a preset method. It is assumed that, before the menu for setting a virtual illumination effect is selected, previously captured images are stored in the memory. If it is determined that one of the displayed images has been selected at step S220, the controller displays the selected image on the entire screen of the display unit. After that, the controller detects the face outline from the selected, displayed image at step S230.

In an exemplary implementation, a user may capture an image and then select the menu for setting a virtual illumination effect. In that case, after capturing the image, the controller proceeds to step S230 to detect the face outline from the captured image.

The face outline can be detected by a mask filter. In an exemplary embodiment of the present invention, the mask filter includes a Sobel filer, a Prewitt filter, a Roberts filter, a Laplacian filter, a Canny filter, etc.

After that, the controller recognizes the outlines of the eyes, nose and mouth at step S240. Although the exemplary embodiment of the present invention is implemented in such a way that the recognition process is performed based on the eyes, nose and mouth on the face of a person's image, it should be understood that the present invention is not limited to the exemplary embodiment. For example, the exemplary embodiment can be modified in such a way to recognize another portion on the face.

In addition, although, in an exemplary embodiment of the present invention, the image display method is performed with respect to a person's image, it should be understood that the present invention is not limited to the exemplary embodiment. For example, the exemplary embodiment can be modified in such a way to perform an image display function with respect to a landscape. If the image is a landscape, the process of detecting the face outline at step S230 and the process of recognizing the features at step S240 may be omitted.

After the controller recognizes the outlines of the eyes, nose and mouth at step S240, it displays menus for inputting the position, the type, and the brightness of virtual illumination on the display unit 150 at step S250. These menus are shown on the screen as a captured image 510 in FIG. 5.

The menu for inputting the position of virtual illumination is displayed by a virtual illumination image. The user can move the virtual illumination image on the image to input the virtual illumination position. If the portable terminal is implemented to include a touch screen, the virtual illumination image can be dragged and placed in a certain position. In contrast, other types of portable terminal, implemented not to include a touch screen, can receive the virtual illumination position as the user operates the direction keys of a key pad. The virtual illumination image may be implemented with an image of one of an electric bulb and a dot. The virtual illumination image may be also implemented with a coordinate axis, such as 2-dimensional coordinate system (x-, and y-axes), 3-dimensional coordinate system (x-, y- and z-axes). If the virtual illumination image is implemented with a coordinate axis, the position of the virtual illumination can be determined as the user inputs respective coordinates.

Figure 5:
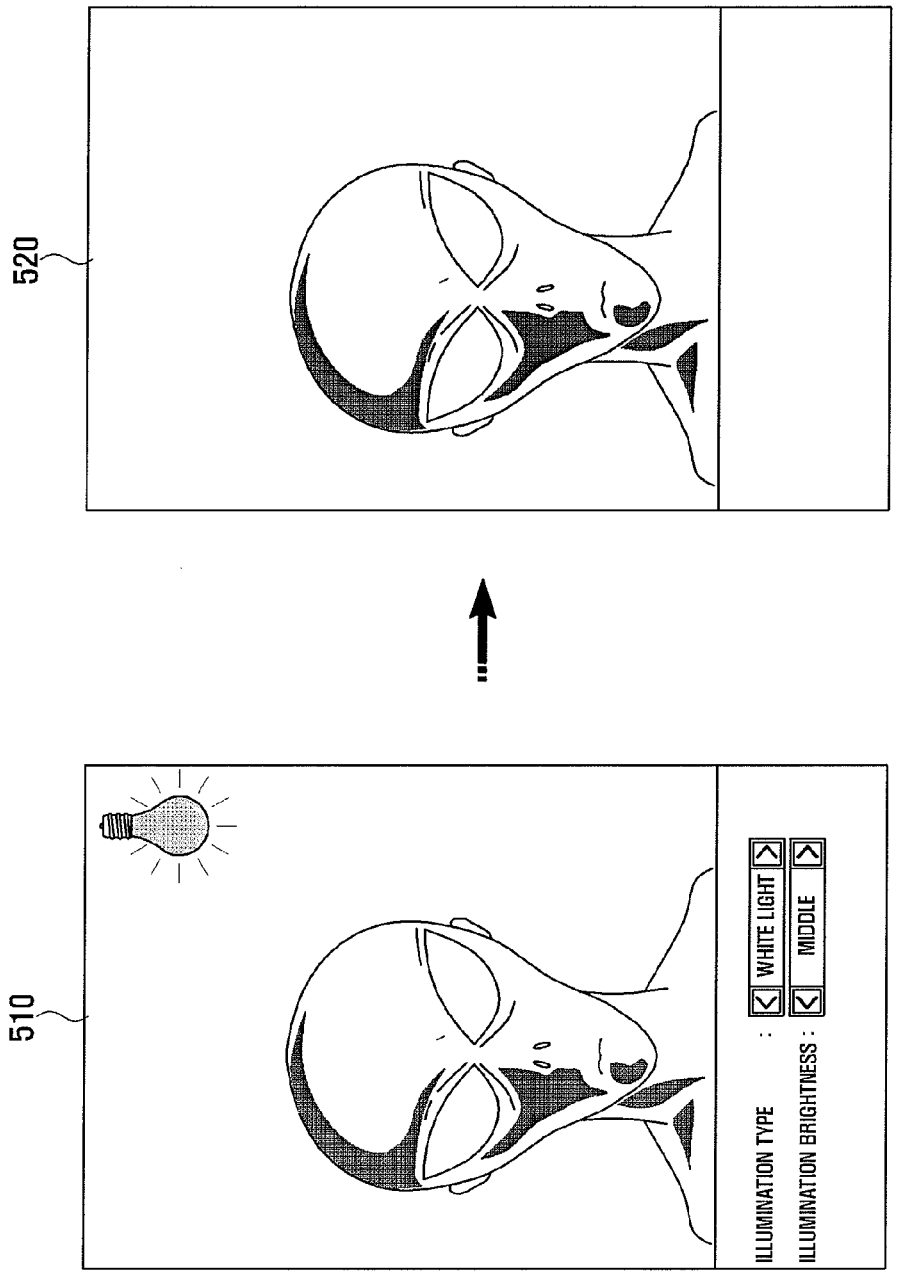
FIG. 5 shows screens displayed on a display unit according to an exemplary embodiments.

The menu for inputting the type of virtual illumination can be shown on a portion of the screen that displays a captured image 510 in FIG. 5 or on the entire screen. The user can select one of the types of virtual illumination that are previously set in the portable terminal. The types of virtual illumination can be classified by illumination colors, for example, a white light source, a yellow light source, a blue light source, a red light source, etc. They can also be classified by illumination devices, such as a glow lamp, a fluorescent lamp, a halogen lamp, etc. Furthermore, they can also be classified by illuminating methods, such as a direction illumination method, a semi-direct illumination method, a general diffused illumination method, an indirect illumination method, etc. Therefore, the user can select desired virtual illumination to apply a virtual illumination effect to the captured image.

The menu for inputting levels of brightness of virtual illumination can also be shown on a portion of the screen that displays a captured image 510 in FIG. 5 or on the entire screen. The user can select one of the levels of brightness of virtual illumination previously set in the portable terminal. The brightness of virtual illumination can be displayed according to the levels, such as Highest, High, Low, Lowest, etc. The levels of brightness of virtual illumination can also be displayed by illuminance, such as 10 lux, 100 lux, 1,000 lux, etc. Therefore, the user can easily select desired level of brightness of virtual illumination to apply a virtual illumination effect to the captured image.

When the user inputs the position, the type and the brightness of virtual illumination into the input unit 140 at step S260, the controller sets the virtual illumination according to the user's input. After that, the controller applies the set virtual illumination to the captured image, considering the outlines of the eyes, nose, and mouth, and displays it on the display unit 150 at step S270. The captured image 510 shown in FIG. 5 is the result after applying the outlines of the eyes, nose, and mouth.

After that, the controller determines whether a key to complete the virtual illumination setting is input at step S280. If it is determined that a key to complete the virtual illumination setting has been input at step S280, it stores, as shown in FIG. 5, a captured image 520 to which a virtual illumination effect is applied in the memory 130 at step S290. In contrast, if it is determined that a key to complete the virtual illumination setting is not input at step S280, it proceeds to step S250, where the menus for inputting the position, the type and the brightness of virtual illumination is displayed and the virtual illumination setting process is performed.

Figure 3:
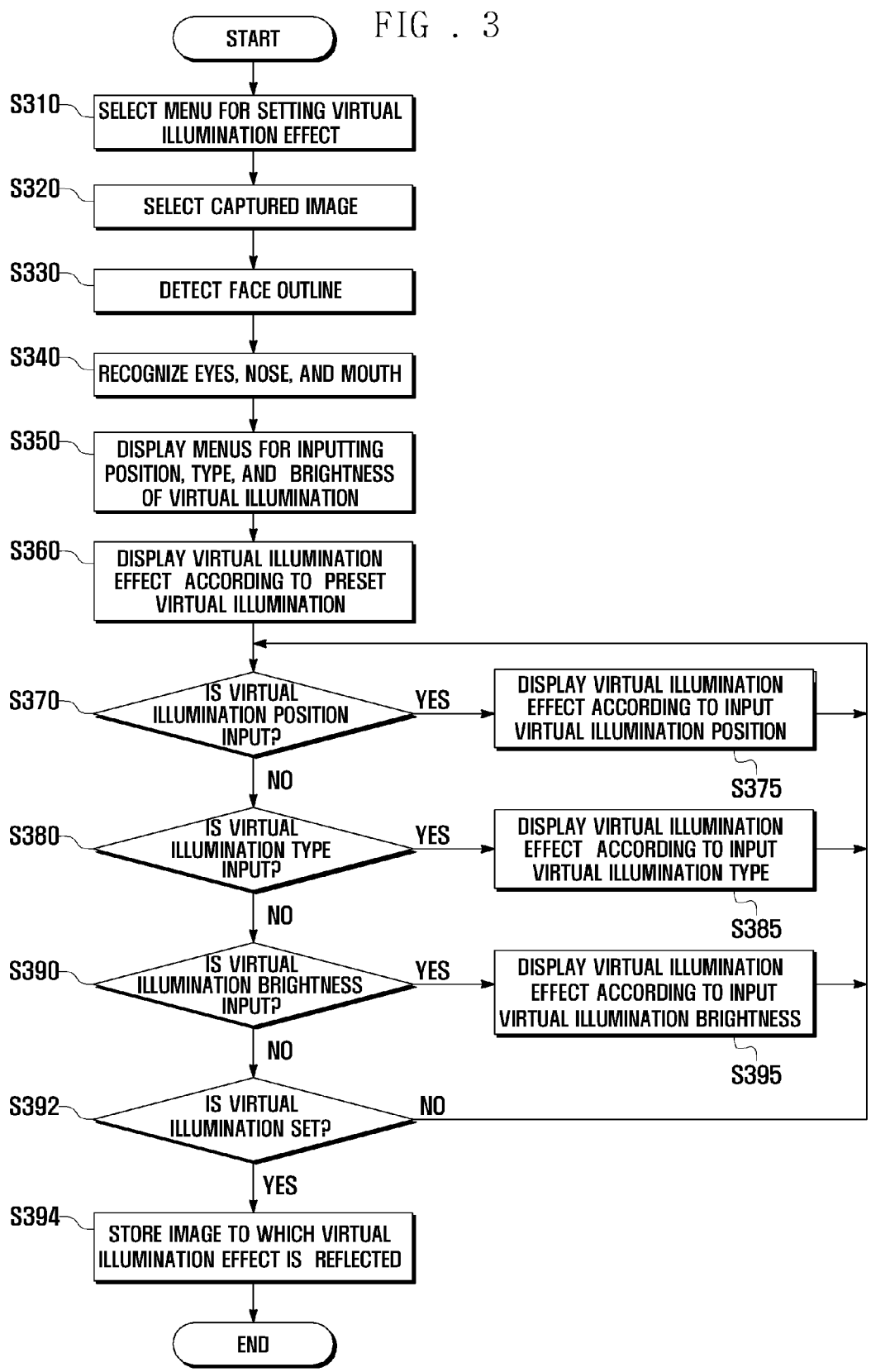
FIG. 3 is a flowchart illustrating a method for displaying an image using virtual illumination according to an exemplary embodiment of the present invention.

FIG. 3 is a flowchart illustrating a method for displaying an image using virtual illumination according to an exemplary embodiment of the present invention.

Referring to FIG. 3, when a menu for setting a virtual illumination effect is selected at step S310, the controller displays images, stored in the memory, on the display unit. The stored images are displayed in a preset method.

When it is determined that one of the displayed images is selected at step S320, it displays the selected image on the entire screen of the display unit. After that, the controller detects the face outline from the selected, displayed image at step S330.

The face outline can be detected by a mask filter. In an exemplary embodiment of the present invention, the mask filter includes a Sobel filter, a Prewitt filter, a Roberts filter, a Laplacian filter, a Canny filter, etc.

After detecting the face outline, the controller recognizes the outlines of the eyes, nose and mouth at step S340. Next, the controller displays menus for inputting the position, the type, and the brightness of virtual illumination on the display unit at step S350. These menus are displayed on the screen as a captured image 510 in FIG. 5.

The menu for inputting the position of virtual illumination is displayed by a virtual illumination image. The user can move the virtual illumination image on the image to input the virtual illumination position. If the portable terminal is implemented to include a touch screen, the virtual illumination image can be dragged and placed in a certain position. In contrast, other types of the portable terminal, which do not include a touch screen, can receive the virtual illumination position as the user operates the direction keys of a key pad. The virtual illumination image may be implemented with an image of an electric bulb or a dot. The virtual illumination image may be also implemented with a coordinate axis, such as a 2-dimensional coordinate system (x-, and y-axes), or a 3-dimensional coordinate system (x-, y- and z-axes).

The menu for inputting the type of virtual illumination can be shown on a portion of the screen that displays a captured image 510 in FIG. 5 or on the entire screen. The user can select one of the types of virtual illumination that are previously set in the portable terminal. The types of virtual illumination can be classified by illumination colors, for example, a white light source, a yellow light source, a blue light source, a red light source, etc. The types of virtual illumination can also be classified by illumination sources, such as a glow lamp, a fluorescent lamp, a halogen lamp, etc. Furthermore, the types of virtual illumination can also be classified by illuminating methods, such as a direction illumination method, a semi-direct illumination method, a general diffused illumination method, an indirect illumination method, etc. Therefore, the user can select desired virtual illumination to apply a virtual illumination effect to the captured image.

The menu for inputting levels of brightness of virtual illumination can also be shown on a part of the screen that displays a captured image 510 in FIG. 5 or on the entire screen. The user can select one of the levels of brightness of virtual illumination previously set in the portable terminal. The brightness of virtual illumination can be displayed by the levels of brightness, such as Highest, High, Low, Lowest, etc. The levels of brightness of virtual illumination can also be displayed by illuminance, such as 10 lux, 100 lux, 1,000 lux, etc. Therefore, the user can select desired level of brightness of virtual illumination to apply a virtual illumination effect to the captured image.

After displaying the position, the type and the brightness of virtual illumination on the display unit, the controller displays a virtual illumination effect according to a preset value at step S360. The preset value may be one of a default value set in the portable terminal and a user's setting value.

After that, the controller determines whether the position of virtual illumination is input at step S370. If it is determined that the virtual illumination position is input as the user moves the virtual illumination image at step S370, the controller displays a virtual illumination effect according to the input virtual illumination position at step S375. After that, the controller returns to step S370 to re-determine whether the position of virtual illumination is input. In this stage, the user can re-input a position of virtual illumination that the user desires to alter, which is a new position of virtual illumination. In that case, the controller recognizes the newly input position of virtual illumination and then displays a virtual illumination effect according thereto.

In contrast, if it is determined that the virtual illumination position is not input at step S370, the controller determines whether the type of virtual illumination is input at step S380. If it is determined that a new type of virtual illumination, which differs from the default type of virtual illumination, is input at step S380, the controller receives and recognizes a new type of virtual illumination via the menu for inputting the type of virtual illumination and then displays a virtual illumination effect according to the input type of virtual illumination at step S385. After that, the controller returns to step S370.

After that, the controller determines whether the brightness of virtual illumination is input at step S390. If it is determined that the brightness of virtual illumination is input at step S390, the controller displays a virtual illumination effect, according to the input brightness of virtual illumination, on the display unit at step S395. After that, the controller returns to step S370.

The user can selectively input the position, the type, and the brightness of virtual illumination to set the virtual illumination. Each time the user inputs the position, the type, and the brightness of virtual illumination, the controller recognizes the user's input and applies a virtual illumination effect according to the user's input to the captured image.

The controller applies the virtual illumination effect to the captured image, considering the outlines of the eyes, nose and mouth. The image is shown as a captured image 510 in FIG. 5. That is, the image on the screen shows darkness and brightness regarding the eyes, nose and mouth according to virtual illumination.

After that, the controller determines whether a key to complete the virtual illumination setting is input via the input unit 140 at step S392. If it is determined that a key to complete the virtual illumination setting is input at step S392, it stores, as shown in FIG. 5, the captured image 520 to which the virtual illumination effect is applied, in the memory at step S394. In contrast, if it is determined that a key to complete the virtual illumination setting is not input at step S392, the controller returns to step S370 and performs a virtual illumination setting process.

Figure 4:
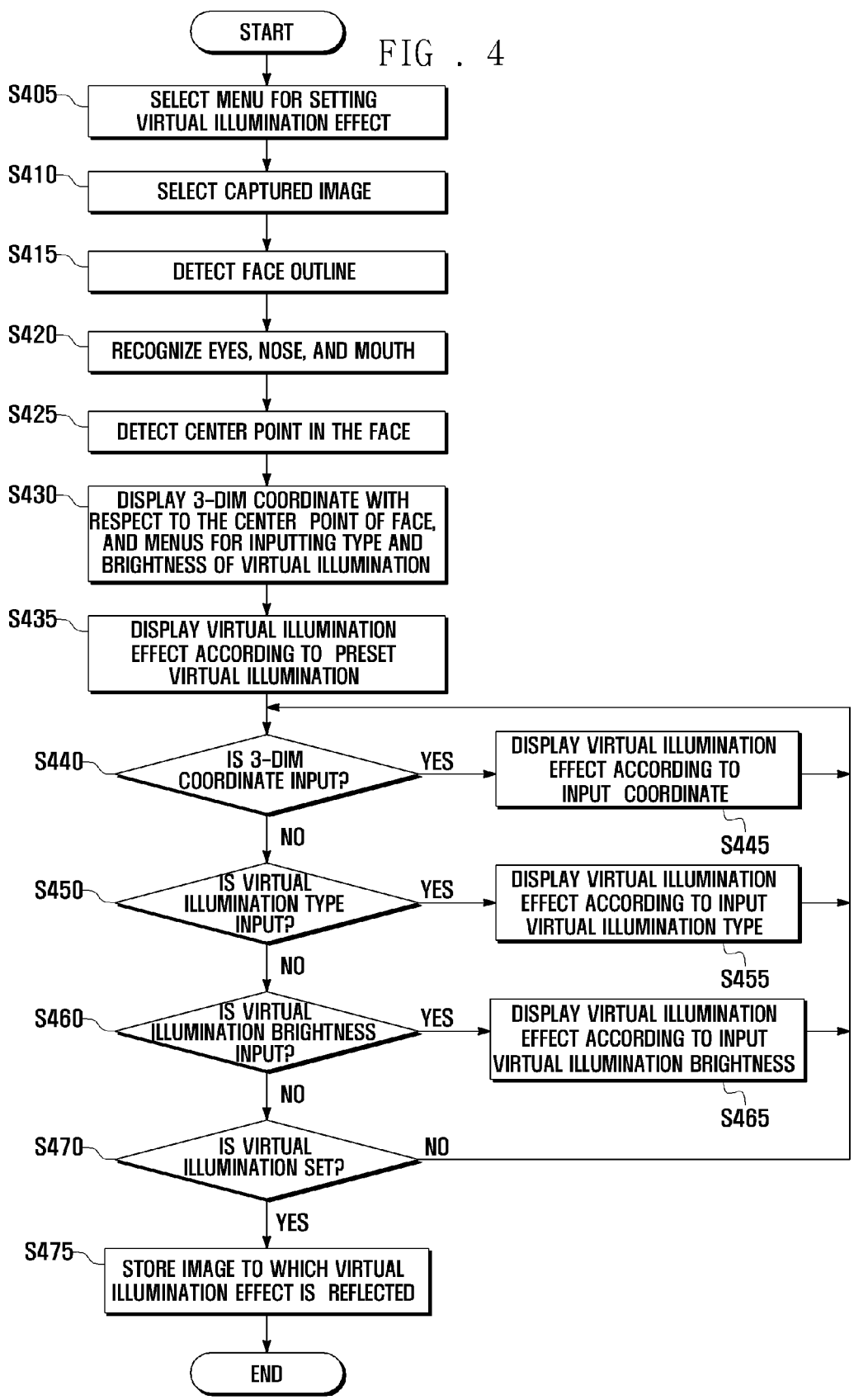
FIG. 4 is a flowchart illustrating a method for displaying an image using virtual illumination according to an exemplary embodiment of the present invention.

FIG. 4 is a flowchart illustrating a method for displaying an image using virtual illumination according to an exemplary embodiment of the present invention.

Referring to FIG. 4, when a menu for setting a virtual illumination effect is selected at step S405, the controller displays images, stored in the memory, on the display unit. The stored images are displayed in a preset method.

If it is determined that one of the displayed images is selected at step S410, the controller displays the selected image on the entire screen of the display unit. After that, the controller detects the face outline from the selected, displayed image at step S415.

The face outline can be detected by a mask filter. In an exemplary embodiment of the present invention, the mask filter includes a Sobel filter, a Prewitt filter, a Roberts filter, a Laplacian filter, a Canny filter, etc.

After detecting the face outline, the controller recognizes the outlines of the eyes, nose and mouth at step S420. Next, the controller detects the center of the face, based on the recognized eyes, nose and mouth, using a preset algorithm at step S425. It should be understood that the exemplary embodiment can be modified in such a way that the center of the face is detected by the end portion of the nose. It will also be appreciated that the center of the face can be acquired as the center of gravity of a triangle formed by the eyes and the nose or mouth. It should also be understood that the center of the face can be obtained by portions other than the eyes, nose and mouth.

After that, the controller displays 3-dimensional coordinate axes with respect to the center point of the face, a menu for inputting a 3-dimensional coordinate, a menu for inputting type of virtual illumination, and a menu for inputting brightness of virtual illumination at step S430. A screen 610 of FIG. 6 displays those menus.

Figure 6:
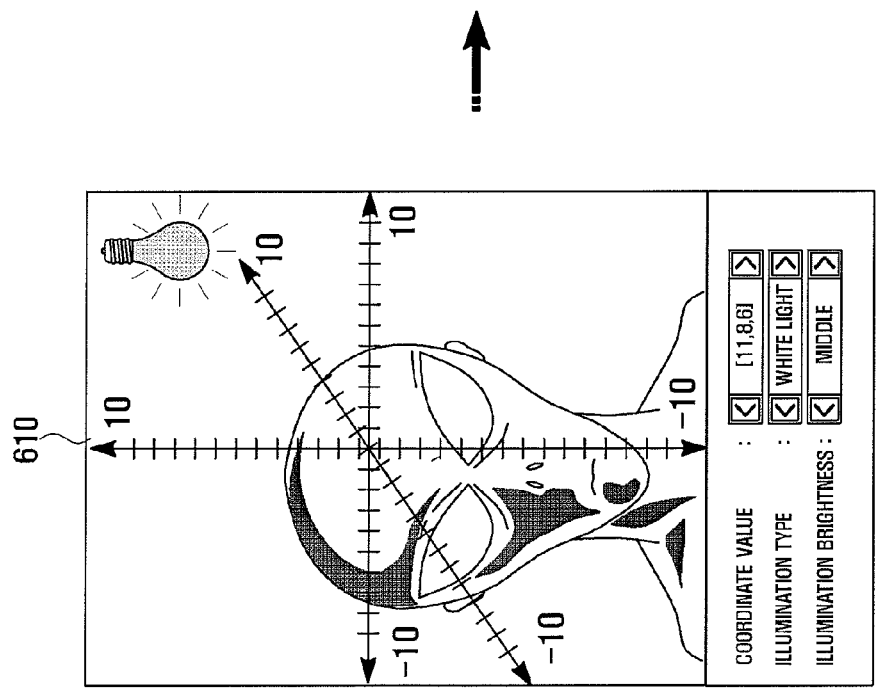
FIG. 6 shows screens displayed on a display unit according to an exemplary embodiment.

As illustrated in FIG. 6, 3-dimensional coordinate axes are displayed with respect to the center point of the face. The menu for inputting a 3-dimensional coordinate is located below the 3-dimensional coordinate axes and allows a user to set the position of the virtual illumination. That is, the user inputs x-, y- and z-parameter values in the menu for inputting a 3-dimensional coordinate to set the position of the virtual illumination. The 3-dimensional coordinate axes are displayed on the screen in such a way that its reference point (0, 0, 0) is located at the center point of the face. As illustrated in screen 610 of FIG. 6, each of x-, y- and z-axes is marked with scales, so that the user can input the coordinate values to set the position of the virtual illumination. For example, the user can input corresponding coordinate values in the range of scales to set the position of the virtual illumination. The user can also input coordinate values out of the range of scales to set the position of the virtual illumination. In that case, the virtual illumination can be set to a certain position outside of the screen, and a corresponding virtual illumination effect can be applied to the image.

The menu for inputting a type of virtual illumination can be shown on a portion of the screen 610 that displays a captured image 510 in FIG. 5 or on the whole screen. The user can select one of the types of virtual illumination that are previously set in the portable terminal. The types of virtual illumination can be classified by illumination colors, for example, a white light source, a yellow light source, a blue light source, a red light source, etc. The types of virtual illumination can also be classified by illumination sources, such as a glow lamp, a fluorescent lamp, a halogen lamp, etc. Furthermore, the types of virtual illumination can also be classified by illumination methods, such as a direction illumination method, a semi-direct illumination method, a general diffused illumination method, an indirect illumination method, etc. Therefore, the user can select desired virtual illumination to apply a virtual illumination effect to the captured image.

The menu for inputting levels of brightness of virtual illumination can also be shown on a part of the screen that displays a captured image 510 in FIG. 5 or on the whole screen. The user can select one of the levels of brightness of virtual illumination previously set in the portable terminal. The brightness of virtual illumination can be displayed by the levels, such as Highest, High, Low, Lowest, etc. The levels of brightness of virtual illumination can also be displayed by illuminance, such as 10 lux, 100 lux, 1,000 lux, etc. Therefore, the user can easily select desired levels of brightness of virtual illumination to apply a virtual illumination effect to the captured image.

Referring back to FIG. 4, after displaying the menus for inputting a position, a type, and brightness of virtual illumination on the display unit 150, the controller displays a virtual illumination effect according to a preset value at step S435. The preset value may be a default value set in the portable terminal or a user's set value.

The controller determines whether 3-dimensional coordinate values are input at step S440. If it is determined that the user inputs 3-dimensional coordinate values in the menu for inputting 3-dimensional coordinates at step S440, it recognizes the user's input and displays a virtual illumination effect according to the position of virtual illumination corresponding to the user's input 3-dimensional coordinate values at step S445. After that, the controller returns to step S440. If the user desires to alter the position of virtual illumination, the user can input new 3-dimensional coordinate values. In that case, the controller recognizes the user's newly input 3-dimensional coordinate values and displays a virtual illumination effect according thereto.

In contrast, if it is determined that the 3-dimensional coordinate values are not input at step S440, it determines which type of virtual illumination is input at step S450. If it is determined that a new type of virtual illumination, which differs from the default type of virtual illumination, is input at step S450, the controller recognizes the new type of virtual illumination and then displays a virtual illumination effect according thereto at step S455. After that, the controller returns to step S440.

After that, the controller determines whether the brightness of virtual illumination is input at step S460. If it is determined that the brightness of virtual illumination is input at step S460, it displays a virtual illumination effect according to the input brightness of virtual illumination on the display unit 150 at step S465. After that, the controller returns to step S440.

The user can selectively input the position, the type, and the brightness of virtual illumination to set the virtual illumination. Each time the user inputs the position, the type, and the brightness of virtual illumination, the controller recognizes the user's input and applies a virtual illumination according to the user's input to the captured image.

The controller applies the virtual illumination effect to the captured image, considering the outlines of the eyes, nose and mouth. The image is shown on the screen 610 in FIG. 6. The screen 610 shows darkness and brightness regarding the outlines of the eyes, nose and mouth according to virtual illumination.

The controller determines whether a key to complete the virtual illumination setting is input via the input unit at step S470. If it is determined that a key to complete the virtual illumination setting is input at step S470, it stores, as shown in FIG. 6, the captured image 620 to which the virtual illumination effect is applied, in the memory at step S475. In contrast, if it is determined that a key to complete the virtual illumination setting is not input at step S470, the controller returns to step S440 and performs a virtual illumination setting process, again.

As described above, the method and the portable terminal using the method, according to exemplary embodiments of the present invention, can reflect a user's desired illumination effect on a captured image so that the image reflects an effect that was captured under an external light source as desired by the user.

While the invention has been shown and described hereinabove with reference to certain exemplary embodiments thereof, it should be understood by those skilled in the art that various changes in form and details may be made therein without departing from the spirit and scope of the present invention as defined in the appended claims and their equivalents.

What is claimed is:

1. A method for displaying an image in a portable terminal, the method comprising:
   receiving virtual illumination input;
   setting virtual illumination in a captured image based on the virtual illumination input; and
   displaying a virtual illumination effect according to the set virtual illumination,
   wherein the virtual illumination input comprises a position of the virtual illumination.

2. The method of claim 1, wherein the setting of the virtual illumination comprises:
   displaying a menu for inputting the position of virtual illumination at the input position on the captured image.

3. The method of claim 1, wherein the setting of the virtual illumination comprises:
   displaying menus for inputting a type and brightness of virtual illumination; and
   setting, if the type and brightness of the virtual illumination are input, the virtual illumination according to the input type and brightness of the virtual illumination.

4. A method for displaying an image in a portable terminal, the method comprising:
   receiving virtual illumination input;
   recognizing a face of a person in a captured image;
   setting virtual illumination in the captured image based on the virtual illumination input and the recognized face of the person; and
   displaying a virtual illumination effect according to the set virtual illumination,
   wherein the virtual illumination input comprises a position of the virtual illumination.

5. The method of claim 4, wherein the recognizing of the face of the person comprises:
   detecting a face outline from the captured image.

6. The method of claim 5, wherein the recognizing of the face of the person comprises:

recognizing eyes, nose, and mouth using the detected face outline.

7. The method of claim 4, wherein the setting of the virtual illumination comprises:
displaying a menu for inputting the virtual illumination at the input position on the captured image.

8. The method of claim 7, wherein the setting of the virtual illumination comprises:
displaying menus for inputting a type and brightness of virtual illumination; and
setting, if the type and brightness of the virtual illumination are input, the virtual illumination according to the input type and brightness of the virtual illumination.

9. The method of claim 6, wherein the displaying of the virtual illumination effect comprises:
displaying a virtual illumination effect, considering the set virtual illumination, the detected face outline, and outlines of the recognized eyes, nose, and mouth.

10. The method of claim 4, further comprising:
detecting the center of the face of the person in the captured image.

11. The method of claim 6, further comprising:
detecting the center point of the face based on the detected face outline and the recognized eyes, nose and mouth.

12. The method of claim 4, wherein the setting of the virtual illumination comprises:
displaying a 3-dimensional coordinate of the captured image and a menu for inputting the 3-dimensional coordinate; and
setting, if the 3-dimensional coordinate is input to the menu, a position of virtual illumination according to the input 3-dimensional coordinate.

13. The method of claim 12, wherein the setting of the virtual illumination comprises:
displaying menus for inputting a type and brightness of virtual illumination; and
setting, if the type and brightness of the virtual illumination are input, the virtual illumination according to the input type and brightness of the virtual illumination.

14. The method of claim 6, wherein the displaying of the virtual illumination effect comprises:
displaying a virtual illumination effect, considering the set virtual illumination, the detected face outline, and outlines of the recognized eyes, nose, and mouth.

15. A portable terminal for displaying an image, the terminal comprising:
a camera part for capturing a subject;
a display unit for displaying a captured image and a virtual illumination effect;
an input unit for receiving virtual illumination input; and
a controller for setting virtual illumination in the captured image based on the virtual illumination input and for controlling the display unit to display the virtual illumination effect according to the set virtual illumination,
wherein the virtual illumination input comprises a position of the virtual illumination.

16. The terminal of claim 15, wherein the controller sets a type and brightness of virtual illumination in the captured image.

17. The terminal of claim 15, wherein the controller detects a face outline if the captured image is a person's image and recognizes the eyes, nose and mouth using the detected face outline.

18. The terminal of claim 17, wherein the controller detects the center point of the face in the captured image, using the detected face outline and the recognized eyes, nose and mouth.

* * * * *